(12) United States Patent
Zasypkin et al.

(10) Patent No.: US 9,687,010 B2
(45) Date of Patent: Jun. 27, 2017

(54) EXTRUSION ENCAPSULATION OF ACTIVES AT AN INCREASED LOAD, USING SURFACE ACTIVE PLANT EXTRACTS

(71) Applicant: McCormick & Company Incorporated, Sparks, MD (US)

(72) Inventors: Dmitriy Zasypkin, Cockeysville, MD (US); Shriram Paranjpe, Sparks, MD (US); Michael Reick, Westminster, MD (US); Suzanne Johnson, White Hall, MD (US)

(73) Assignee: McCormick & Company, Incorporated, Sparks, MD (US)

(*) Notice: Subject to any disclaimer, the term of this patent is extended or adjusted under 35 U.S.C. 154(b) by 0 days.

(21) Appl. No.: 13/828,533

(22) Filed: Mar. 14, 2013

(65) Prior Publication Data

US 2013/0243851 A1    Sep. 19, 2013

Related U.S. Application Data

(60) Provisional application No. 61/610,635, filed on Mar. 14, 2012.

(51) Int. Cl.
| | | |
|---|---|---|
| *A23L 1/00* | (2006.01) | |
| *A23L 1/22* | (2006.01) | |
| *A23L 1/29* | (2006.01) | |
| *B01J 2/20* | (2006.01) | |
| *A23P 10/30* | (2016.01) | |
| *A23L 27/00* | (2016.01) | |

(52) U.S. Cl.
CPC .............. *A23L 1/0029* (2013.01); *A23L 27/72* (2016.08); *A23P 10/30* (2016.08); *B01J 2/20* (2013.01)

(58) Field of Classification Search
CPC ........ A23L 1/0029; A23L 27/72; A23P 10/30; B01J 2/20
USPC .... 424/451; 426/96, 72, 658, 661, 648, 650, 426/651
See application file for complete search history.

(56) References Cited

U.S. PATENT DOCUMENTS

| | | | |
|---|---|---|---|
| 3,922,354 A | 11/1975 | Galluzzi et al. | |
| 4,230,687 A | 10/1980 | Sair et al. | |
| 4,689,235 A | 8/1987 | Barnes et al. | |
| 4,698,264 A | 10/1987 | Steinke | |
| 4,707,367 A * | 11/1987 | Miller et al. | 426/96 |
| 4,820,534 A | 4/1989 | Saleeb et al. | |
| 5,009,900 A | 4/1991 | Levine et al. | |
| 5,183,690 A | 2/1993 | Carr et al. | |
| 5,601,865 A | 2/1997 | Fulger et al. | |
| 5,603,971 A | 2/1997 | Porzio et al. | |
| 5,709,895 A | 1/1998 | Tanaka et al. | |
| 5,756,136 A | 5/1998 | Black et al. | |
| 5,792,505 A | 8/1998 | Fulger et al. | |
| 5,846,580 A | 12/1998 | Franke et al. | |
| 5,897,897 A | 4/1999 | Porzio et al. | |
| 5,945,127 A * | 8/1999 | Breitenbach | A61K 9/1635 424/465 |
| 5,958,502 A | 9/1999 | Fulger et al. | |
| 5,972,395 A | 10/1999 | Saleeb et al. | |
| 6,187,351 B1 | 2/2001 | Porzio et al. | |
| 6,416,799 B1 | 7/2002 | Porzio et al. | |
| RE37,860 E | 9/2002 | Blake et al. | |
| 6,468,568 B1 | 10/2002 | Leusner et al. | |
| 6,607,771 B2 | 8/2003 | Benczedi et al. | |
| 6,607,778 B2 * | 8/2003 | Mutka | A23L 1/0029 426/103 |
| 6,652,895 B2 | 11/2003 | Porzio et al. | |
| 6,790,453 B2 | 9/2004 | Porzio et al. | |
| 6,932,982 B2 * | 8/2005 | McIver | A23L 1/0029 424/484 |
| 6,984,449 B2 | 1/2006 | Bretschneider et al. | |
| 7,488,503 B1 | 2/2009 | Porzio et al. | |
| 7,799,341 B2 | 9/2010 | Porzio et al. | |
| 7,803,414 B2 | 9/2010 | Van Lengerich et al. | |
| 8,017,060 B2 | 9/2011 | Benczedi et al. | |
| 8,142,831 B2 | 3/2012 | Van Lengerich et al. | |

(Continued)

FOREIGN PATENT DOCUMENTS

| | | |
|---|---|---|
| DE | 202009001095 | 4/2010 |
| DE | 202010001413 | 6/2010 |

(Continued)

OTHER PUBLICATIONS

Sophisticated Solutions for Simplified Labels: retrieved from internet: http://www.globalfoodforums.com/wp-content/uploads/2013/11/2013cleanlabel-Ingredion-Diaz.pdf. Retrieved on Oct. 31, 2014.*
Soya lecithin: retrieved from internet: http://www.drugs.com/mtm/soya-lecithin.html. Retrieved on Dec. 17, 2015.*
Quillaia extracts: retrieved form internet: http://www.fao.org/fileadmin/templates/agns/pdf/jecfa/cta/61/QUILLAIA.pdf. Retrieved on Aug. 19, 2016.*
U.S. Appl. No. 14/200,441, filed Mar. 7, 2014, Zasypkin, et al.
U.S. Appl. No. 14/218,400, filed Mar. 18, 2014, Zasypkin, et al.
Firmenich Flavor Datasheet Techical Datasheet, Natrual Lemon Durarome 860188 TD1091, Date of issue: Aug. 29, 2012, pp. 1-2.
M Porzio, "Flavor Encapsulation: A Convergence of Science and Art",, *Food Technology*, Jul. 2004, vol. 58, No. 7, pp. 1-6.

*Primary Examiner* — Hong Yu
(74) *Attorney, Agent, or Firm* — Greenblum & Bernstein, P.L.C.

(57) ABSTRACT

A glassy extrusion encapsulation composition and a method of making the composition are provided. The encapsulation composition comprises an encapsulate encapsulated in a glassy matrix comprising 0.5 to 12% by weight, based on the total weight of the glassy matrix, of at least one surface active plant extract, and 88 to 99.5% of at least one carbohydrate. The addition of a surface active plant extract to a carbohydrate matrix markedly increases the load of an encapsulate in the encapsulation composition. Such glassy matrices are useful for encapsulation of encapsulates, for example, flavors and medications. A food composition containing the encapsulation composition is also provided.

41 Claims, No Drawings

(56) References Cited

U.S. PATENT DOCUMENTS

| | | |
|---|---|---|
| 8,227,014 B2 | 7/2012 | Bouquerand |
| 8,257,738 B2 | 9/2012 | Porzio et al. |
| 8,303,871 B2 | 11/2012 | Boothe et al. |
| 2002/0031653 A1* | 3/2002 | Ricciardelli et al. ...... 428/297.4 |
| 2005/0069628 A1* | 3/2005 | Goto ...................... A23G 3/346 426/658 |
| 2005/0220981 A1 | 10/2005 | Renz et al. |
| 2007/0128234 A1 | 6/2007 | Subramaniam et al. |
| 2008/0206325 A1 | 8/2008 | Bouquerand et al. |
| 2010/0172945 A1 | 7/2010 | Gregson et al. |
| 2011/0256199 A1 | 10/2011 | Zasypkin |
| 2012/0009263 A1 | 1/2012 | Gregson et al. |
| 2012/0027866 A1 | 2/2012 | Gregson et al. |
| 2012/0064219 A1 | 3/2012 | Barra et al. |
| 2012/0328732 A1 | 12/2012 | Bouquerand |

FOREIGN PATENT DOCUMENTS

| | | | |
|---|---|---|---|
| EP | 1504673 | 2/2005 | |
| EP | 1572344 | 9/2005 | |
| WO | 2011/121468 | 10/2011 | |
| WO | WO 2011/161658 A1 * | 12/2011 | ............... A61K 9/16 |
| WO | 2012/021936 | 2/2012 | |
| WO | 2012/175423 | 12/2012 | |

\* cited by examiner

EXTRUSION ENCAPSULATION OF ACTIVES AT AN INCREASED LOAD, USING SURFACE ACTIVE PLANT EXTRACTS

This application claims the benefit of priority of provisional application Ser. No. 61/610,635 filed on Mar. 13, 2012.

BACKGROUND OF THE INVENTION

Field of the Invention

The present invention relates to encapsulation compositions in a glassy state in which an encapsulate is encapsulated in a glassy matrix by a process known as melt extrusion. Melt extrusion should be distinguished from numerous drying processes including spray-, freeze-, tray-, or drum-drying, which could also lead to encapsulation of actives in a glassy state. Melt extrusion generates the glassy state mainly by cooling the melted material while drying processes generate glassy products mainly by drying. This difference leads to distinct and in many cases advantageous flavor encapsulation and flavor release properties of melt extrusion compositions.

More particularly, the present invention relates to flavor encapsulation compositions in which a flavoring agent is encapsulated by melt extrusion in a glassy matrix containing carbohydrates and surface active plant extracts as a major part of the matrix. The surface active plant extracts especially those rich in saponins have been found to significantly increase the maximum amount of encapsulated flavor that can effectively be encapsulated in a glassy matrix. This is particularly critical for all-natural matrix compositions known for their limited flavor holding capacity. The present invention also relates to processes for preparing such compositions and use of the compositions in food applications.

DISCUSSION OF THE BACKGROUND

The encapsulation of encapsulates is an area of active research. In particular, the encapsulation of encapsulates such as flavoring agents, medications, pesticides, preservatives, vitamins and other dietary supplements is desired for a number of reasons. In the case of flavors, medications and pesticides, encapsulation may be desired to achieve their controlled release. The encapsulation may be carried out to protect flavors and vitamins from air-oxidation and, thus, to extend shelf life of the vitamins. In the case of flavoring agents, the encapsulation may be carried out to place the flavorings in an easily metered form which will protect flavor integrity and release the flavors at a controllable event, such as the addition of water.

Various encapsulation processes are known to lead to a glassy state of the encapsulating matrix that serves as a flavor carrier. The advantages of retaining the glass form of the matrix include increased physical stability of the dense solid, reduced oxidation and loss of incorporated volatiles, and reduction of deleterious intermolecular reactions and oxidation. A glassy carrier can be made uniform with minimum imperfections such as pores or cracks for better protection of flavors and other encapsulants. The preparation of a solid in the glassy state depends upon both a matrix composition and a process used for generating an encapsulating material.

Current practical commercial processes leading to stable, dry flavors in the glassy state are limited in great part to spray drying and extrusion fixation. The former process requires emulsification or solubilization of the flavor in an aqueous carrier containing encapsulation solids, followed by rapid drying at a high temperature, high velocity gas stream and collection as a low-density bulk solid. The resultant moisture of the encapsulated compositions is in the range of 1%-4% assuring the glassy state at a temperature below 50° C. While spray drying accounts for many commercially encapsulated flavor materials, several limitations of the process are evident. Low molecular weight components of compounded or natural flavor mixtures generally exhibit a high vapor pressure and could evaporate, react or disproportionate during the process. The resultant encapsulated flavors are porous, powdery and difficult to handle. The final product, a dry, free flowing fine powder releases encapsulates rapidly upon hydration whether the rapid release is desired or not. The fine powder in many instances is prone to caking, difficult to handle or mix with other ingredients, and might present an explosion hazard.

Some other encapsulation processes may include freeze-drying, drum-drying and tray-drying. These processes have marginal significance due to a high processing cost, resulting porous structure of the material, and relatively poor protection of encapsulates, compared to spray drying and extrusion. The processes of drying are slow in the case of freeze- and tray-drying, and result in a weak glassy character of the material generated by slow drying rather than by quick cooling. Volatile flavor losses are very significant. Drum drying could be a fast process; however, loss of volatile components is very significant on the contact with a high temperature drying surface. All of the above processes other than spray-drying require a milling step further weakening the flavor. A preparation step involves making slurry where spices and herbs swell and form a viscous dispersion that is difficult to control and process. Considering the above limitations, melt extrusion offers significant advantages in flavor retention, protection of flavor integrity, and controlled release properties.

It is important to mention that melt extrusion is not a drying process. It generates glassy compositions by melting matrix components, followed by a quick cooling of the melt. Optionally, in-process or post-processing drying could be applied to further control moisture and other properties of compositions. Water or aqueous solutions used as a plasticizer are added in the amounts not preventing the formation of a glassy matrix with the glass transition temperature above ambient temperature. In other words, a quick cooling of encapsulation compositions makes the compositions glassy without significant water evaporation. This distinguishes the melt extrusion process from spray-, drum-, or tray drying where a glassy matrix may be obtained mainly though evaporation of water from a slurry. Additional optional drying can be applied to further increase glass transitions temperature of extruded compositions.

In U.S. Pat. Nos. 5,009,900 and 5,972,395 that describe melt extrusion encapsulation compositions, matrix compositions are carefully selected to accommodate processing limitations of an extruder as well as to generate a stable matrix in the glassy state characterized by a glass transition temperature of greater than 25° C. The earlier patents describe liquid flavor, essential oils, oleoresins, processed flavors, medications, pesticides, and vitamins as encapsulates (e.g., U.S. Pat. Nos. 6,652,895; 6,416,799; 6,187,351; 5,603,971; and 5,897,897).

An important melt extrusion processing limitation is a limited flavor load. The flavor load could be as low as 1-2% for very volatile flavors and up to 10% with less volatile flavors. Many natural carriers comprising starch, maltodextrin, larch gum, gum Arabic, and lower molecular weight carbohydrates have a limit on the maximum flavor load of about 5-6%. Such a low flavor load in many cases is cost prohibitive and does not deliver the required flavor intensity or functionality in the final applications. Therefore, there is a need to increase a load of encapsulates while protecting flavor integrity.

SUMMARY OF THE INVENTION

Accordingly, it is one object of the present invention to provide novel encapsulation compositions.

It is another object of the present invention to provide novel encapsulation compositions in which an encapsulate is encapsulated in a matrix which is stable in the glassy state at ambient temperatures.

It is another object of the present invention to provide novel encapsulation compositions in which an encapsulate is encapsulated at an increased level compared to a level of the encapsulate when the glassy matrix does not contain at least one surface active plant extract, wherein the increased level is the increased maximum load of an encapsulate.

It is another object of the present invention to provide novel natural encapsulation compositions in which an encapsulate is encapsulated at an increased level compared to a level of the encapsulate when the glassy matrix does not contain at least one surface active plant extract, wherein the increased level is the increased maximum load of an encapsulate.

It is another object of the present invention to provide novel flavor encapsulation compositions which exhibit selected controlled release functionality and provide flavor integrity in product applications.

It is another object of the present invention to provide novel processes for preparing such encapsulation compositions.

According to one object of the present invention is to provide an extrusion encapsulation composition in a glassy state, comprising:

(A) an encapsulate, encapsulated in (B) a glassy matrix, wherein said glassy matrix (B) comprises: 0.5 to 12% by weight, based on the total weight of said glassy matrix (B), of at least one surface active plant extract, and 88 to 99.5% by weight, based on the total weight of said glassy matrix (B), of at least one carbohydrate, wherein a load of an encapsulate (A) is from 0.01% to 20% by weight, based on the total weight of the extrusion encapsulation composition, and wherein the load of the encapsulate (A) is increased due to the presence of the at least one surface active plant extract in the glassy matrix (B), compared to a level of the encapsulate (A) when the glassy matrix (B) does not contain the at least one surface active plant extract;

wherein said extrusion encapsulation composition is prepared by a process comprising:

(i) mixing components of the glassy matrix (B), the encapsulate (A), and, optionally, a plasticizer, thereby obtaining a blend, and melting the blend in an extruder or in a combination of extruders, thereby obtaining a melted mixture comprising the encapsulate (A) and the glassy matrix (B);

(iii) extruding, shaping, and cooling said melted mixture, thereby obtaining said extrusion encapsulation composition, wherein said encapsulate (A) is encapsulated in the glassy matrix (B), and (iv) optionally, drying the extruded encapsulation composition.

Another object of the present invention is to provide an extrusion encapsulation composition in a glassy state, comprising:

(A) an encapsulate, encapsulated in (B) a glassy matrix, wherein said glassy matrix (B) comprises: 0.5 to 12% by weight, based on the total weight of said glassy matrix (B), of at least one surface active plant extract, and 88 to 99.5% by weight, based on the total weight of said glassy matrix (B), of at least one carbohydrate, wherein the encapsulate (A) is at least one component selected from the group consisting of a flavor, a vitamin, a dietary supplement, a medication, a preservative, and a pesticide, wherein a load of the encapsulate (A) is from 0.01% to 20% by weight, based on the total weight of the extrusion encapsulation composition, and wherein the encapsulate (A) and the glassy matrix (B) are melt extruded.

A further object of the present invention is to provide a process for making the extrusion encapsulation compositions of the present invention, comprising:

(i) mixing components of the glassy matrix (B), the encapsulate (A), and, optionally, a plasticizer, thereby obtaining a blend, and melting the blend in an extruder or in a combination of extruders, thereby obtaining a melted mixture comprising the encapsulate (A) and the glassy matrix (B);

(iii) extruding, shaping, and cooling said melted mixture, thereby obtaining said composition, wherein said encapsulate (A) is encapsulated in the glassy matrix (B), and (iv) optionally, drying the extruded encapsulation composition.

A further object of the present invention is to provide a food containing the extrusion encapsulation compositions of the present invention.

These and other objects, which will become apparent from the following detailed description, have been achieved by the inventor's discovery that it is possible to prepare a glassy matrix, which encapsulates up to 8% more of an encapsulate, based on the total weight of the extrusion encapsulation composition, due to the presence in the matrices surface active plant extracts. The increased level of an encapsulate is the increased maximal load of an encapsulate.

DETAILED DESCRIPTION OF THE PREFERRED EMBODIMENTS

The inventor has discovered that it is possible to increase the maximum level of an encapsulate, most notably a flavor, in a glassy extrusion encapsulation composition by up to 8%, based on the total weight of the extrusion encapsulation composition, by the inclusion into a carbohydrate carrier 0.5% to 12% of a surface active plant extract, compared to a level of the encapsulate when the surface active plant extract is not added to the carbohydrate carrier. The maximum load of an encapsulate (A) can be increased in this way up to 20% by weight, based on the total weight of the encapsulation composition. The encapsulation compositions have a glass transition temperature (Tg) sufficiently high such that the glassy matrix is stable at ambient temperature, with the use of an aqueous plasticizer at a level below 10% of the weight of the matrix components. This discovery is surprising, considering that emulsifying properties of surface active ingredients in aqueous emulsions are not necessarily exhibited in highly concentrated melts containing less than 15% water and processed at high temperatures typically in the range from 90° C. to 130° C. Most known surface active ingredients that could be incorporated into a melt extrusion matrix, including modified starches, gums, and proteins, are not effective unless they represent a major component of the matrix.

The maximum encapsulation load is defined as a load when there is no significant loose encapsulate observed or determined otherwise. For example, the encapsulate may be a flavor. A loose flavor (or other loose encapsulate) can be in the form of steam, vapor, dripping or surface oil. A retained flavor (or other retained encapsulate) can be measured with a number of known in the art analytical methods such as volatile oil extraction, partitioning between phases of various polarity, followed by gas chromatographic analysis. While a trace amount of a surface flavor (or other encapsulate) may be present at the surface of an encapsulation composition, typically, the amount does not exceed 10% of the total amount of the encapsulated flavor (or other encapsulate). As described above, the loose flavor could be visible during processing as, e.g., steam and/or dripping. Surface flavor or oil could also be visible and/or determined by touching the strands or measured at any time after cooling the product. A test after storage (e.g., for one month) may not be accurate due to evaporation, oxidation or polymerization of volatile components at the surface. Preferably, the amount of loose encapsulate does not exceed 5%, or does not exceed 1%, or does not exceed 0.5%, or even more preferably does not exceed 0.1% of the total amount of the encapsulate.

The inventors have surprisingly found that relatively low levels of some surface active plant extracts in the range from 0.5% to 12%, most preferably from 3% to 8%, increase the maximum encapsulate load of the encapsulation composition. In particular, inclusion of relatively low levels of surface active plant extracts increases the encapsulation load by up to 5%, 6%, 7%, or 8%, based on the total weight of the extrusion encapsulation composition, compared to a load of the encapsulate when a surface active plant extract is not added to a carbohydrate carrier of the matrix. For example, the maximum flavor load of a maltodextrin-sugar carrier can be increased, depending on the flavor, e.g., from 5-6% to 10-11%, based on the total weight of the extrusion encapsulation composition, by the addition of at least one surface active plant extract to a carbohydrate carrier of the matrix. Thus, the flavor load can be doubled or more without compromising glassy properties of encapsulation compositions or flavor integrity.

The term "the load of an encapsulate is increased by up to 8%, based on the total weight of the extrusion encapsulation composition" thus refers to the absolute weight percent increase in the load of the encapsulate. For example, if a flavor load of an encapsulate (A) is 6% by weight of an extrusion encapsulation composition that does not include a surface active plant extract in the glassy matrix (B), when a surface active plant extract is included in the carbohydrate of the glassy matrix (B), the flavor load of the encapsulate (A) may now be 12% of the total weight of the encapsulation composition without adverse consequences such as flavor leaking out of the matrix. In other words, the maximum flavor load of the encapsulate is increased in this example from 6% to 12% of the total weight of the encapsulate composition after a surface active plant extract is included in the glassy matrix (B).

Thus, in one embodiment, in the encapsulation compositions, (A) an encapsulate is encapsulated in (B) a glassy matrix comprising: 0.5 to 12% by weight, based on the total weight of said glassy matrix (B), of at least one surface active plant extract, and 88 to 99.5% by weight, based on the total weight of said glassy matrix (B), wherein at least one carbohydrate is at least one component selected from the group consisting of a starch, a modified starch, a gum, a maltodextrin, a sugar, a polyol, a corn syrup solid, a modified cellulose, an inulin, a polydextrose, a cyclodextrin, an organic acid, and a salt of an organic acid. The surface active plant extract is at least one extract selected from the group consisting of a *Quillaja* extract, a Stevia extract, a Licorice extract, and another surface active plant extract containing a high level of at least one saponin. Preferably, the level of the at least one saponin in the at least one surface active plant extract is 20% or greater, 50% or greater, or 70% or greater by weight of the extract.

Thus, one aspect of the present invention is to provide the extrusion encapsulation composition in a glassy state, comprising:

(A) an increased load of an encapsulate, encapsulated in (B) a glassy matrix, wherein said glassy matrix (B) comprises: 0.5 to 12% by weight, based on the total weight of said glassy matrix (B), of at least one surface active plant extract, and 88 to 99.5% by weight, based on the total weight of said glassy matrix (B), of at least one carbohydrate, wherein a load of an encapsulate (A) is from 0.01% to 20% by weight, based on the total weight of the extrusion encapsulation composition, and wherein the load of the encapsulate (A) is increased due to the presence of the at least one surface active plant extract in the glassy matrix (B), compared to a level of the encapsulate (A) when the glassy matrix (B) does not contain the at least one surface active plant extract.

The extrusion encapsulation composition is prepared by a process comprising:

(i) mixing components of a glass matrix (B), an encapsulate (A), and, optionally, a plasticizer, thereby obtaining a blend, and melting the blend in an extruder or in a combination of extruders, thereby obtaining a melted mixture comprising the encapsulate (A) and the glass matrix (B);

(iii) extruding, shaping, and cooling said melted mixture, thereby obtaining said extrusion encapsulation composition, wherein said encapsulate (A) is encapsulated in the glassy matrix (B), and (iv) optionally, drying the extruded encapsulation composition.

Another aspect of the present invention is to provide an extrusion encapsulation composition in a glassy state, comprising:

(A) an encapsulate, encapsulated in (B) a glassy matrix, wherein said glassy matrix (B) comprises: 0.5 to 12% by weight, based on the total weight of said glassy matrix (B), of at least one surface active plant extract, and 88 to 99.5% by weight, based on the total weight of said glassy matrix (B), of at least one carbohydrate, wherein the encapsulate (A) is at least one component selected from the group consisting of a flavor, a vitamin, a dietary supplement, a medication, a preservative, and a pesticide, wherein a load of the encapsulate (A) is from 0.01% to 20% by weight, based on the total weight of the extrusion encapsulation composition, and wherein the encapsulate (A) and the glassy matrix (B) are melt extruded.

The increase of the load of the encapsulate (A) is an increase of the maximum load of the encapsulate (A).

In another embodiment, a significant loose encapsulate is not observed or determined otherwise.

In yet another embodiment, an amount of the encapsulate (A) at the surface of the encapsulated composition is not greater than 10%, preferably, not greater than 1%, and more preferably, not greater than 0.01%, of the total amount of the encapsulate (A).

In one embodiment, the extrusion encapsulation composition encapsulates in a glassy matrix comprising a maltodextrin.

In one embodiment, the at least one surface active plant extract is at least one extract selected from the group consisting of a *Quillaja* extract, a Stevia extract, a Licorice extract, and another surface active plant extract containing at least one saponin.

In another embodiment, the at least one carbohydrate is at least one component selected from the group consisting of a starch, a modified starch, a gum, a maltodextrin, a sugar, a polyol, a corn syrup solid, a modified cellulose, an inulin, a polydextrose, a cyclodextrin, an organic acid, and a salt of an organic acid.

In yet another embodiment, the composition has a glass transition temperature of from 25° C. to 80° C.

In a different embodiment, a glassy matrix (B) comprises from 2% to 8% by weight, based on the total weight of said glassy matrix B, of a *Quillaja* extract.

The encapsulate can be at least one component selected from the group consisting of a flavor, a vitamin, a dietary supplement, a medication, a preservative, and a pesticide.

In one embodiment, the encapsulate is a flavor.

In another embodiment, the flavor is at least one flavor selected from the group consisting of a natural flavor, an oleoresin, an essential oil, a protein hydrolyzate, an aqueous reaction flavor, an artificial flavor, and a compounded flavor.

A plasticizer can be at least one plasticizer selected from the group consisting of water, glycerin, and propylene glycol.

In one embodiment, shaping is performed by extruding the melted mixture through a die to form strands, wherein said strands are milled after the drying and cooling.

In another embodiment, shaping is performed by extruding and die-face cutting the melted mixture with a knife to form particles, wherein said particles are cooled and, optionally, dried.

The glassy extrusion encapsulation composition contains less than 12% water, preferably less than 10%, 9%, 8%, 7% 6%, 5% or 4% of water and the encapsulate (A) in the range of from 0.01% to 20%, preferably from 0.01% to 19%, from 0.01 to 18%, from 0.01 to 17%, from 0.01 to 16%, from 0.01 to 15%, from 0.01 to 14%, from 0.01 to 13%, from 0.01 to 12%, from 0.01 to 11%, from 0.01 to 10%, or from 0.5 to 12%, based on the total weight of the glassy extrusion encapsulation composition.

In one embodiment, a glassy matrix (B) comprises from 0.5 to 12% by weight, preferably from 1% to 11%, from 2% to 10%, from 3% to 10%, from 4% to 9%, and more preferably from 5% to 8%, by weight, based on the total weight of said glassy matrix (B), of a surface active plant extract; and from 88 to 99.5% by weight, preferably from 89 to 99%, from 90 to 98%, from 91 to 97%, from 92 to 96%, or from 92 to 95%, based on the total weight of said glassy matrix (B), of at least one carbohydrate selected from the group consisting of a starch, a modified starch, a gum, a maltodextrin, a sugar, a polyol, a corn syrup solid, a modified cellulose, an inulin, a polydextrose, a cyclodextrin, an organic acid, and a salt of an organic acid, which can be used singly or in combination. Suitable surface active plant extracts and carbohydrates are described in more detail immediately below.

The surface active plant extract is at least one extract selected from the group consisting of a *Quillaja* extract, a Stevia extract, a Licorice extract, and another surface active plant extract containing at least one saponin. The extracts may be used singly or in combination. Many plants contain a significant level of saponins as a component of their bark, root, fruit mesocarp, or other parts. Saponins are a class of complex glucosides mainly found as secondary metabolites of some higher plants. Saponins are amphiphilic molecules including a hydrophobic aglycone link to one or more sugar moieties. In general, saponins are classified as triterpenoids, steroids or steroid alkaloids, based on the structure of aglycone. In one embodiment, a surface active plant extract is a *Quillaja* extract obtained from the bark of *Quillaja saponaria*. In another embodiment, a highly purified *Quillaja* extract is used containing more than 20% saponins. Also included are the surface active saponins described in the monograph: Oleszek, W. and Hamed, A. Saponin-Based Surfactants. Chapter 12 in Surfactants from Renewable Resources, Eds. Kjellin, M. and Johansson, I., published by A John Wiley and Sons, Ltd. in 2010, ISBN 978-0-470-76041-3, incorporated herein by reference in its entirety.

The starch suitable for the purpose of this invention could include native and/or pregelatinized waxy, dent, and high amylose starches of at least one plant origin including corn, wheat, potato, pea, and tapioca.

The modified starch can be at least one starch selected from the group consisting of n-octenylsuccinic anhydride modified starches (OSAN-starch). The starches may be concomitantly modified by dextrinization and chemically derivatized with n-octenylsuccinic acid anhydride. Alternatively, the starch may undergo initial chemical or enzymatic hydrolysis followed by the derivatization with n-octenylsuccinic acid anhydride. Examples of such modified OSAN-starches are sold under the trade names: Capsul, Amiogum, Hi-Cap 100, Emcap 12634, Emcap 12639, Miracap, and National 780487 among others.

Maltodextrins are also suitable carbohydrate food polymers. These polymers are derived from partial hydrolyzed forms of corn, rice, wheat, or potato starches utilizing suitable acid or enzymatic catalysis. The maltodextrins are defined as having a Dextrose Equivalent (DE) of 20 or less. Particularly suitable maltodextrins are 5 DE, 10 DE, 15 DE and 18 DE maltodextrins.

Hydrogenated starch hydrolyzates (HSH) are products obtained from the hydrolysis of a starch to generate maltodextrin oligomers. These oligomers are then hydrogenated to convert a terminal reducing sugar moiety to an oligomer with a non-reducing terminal polyol. HSH are included in the group of low molecular weight polyols.

Polydextrose is a glucosyl homopolymer resulting from condensation of glucose in the presence of an acidic catalyst. Polydextrose is included in the group of low molecular weight sugars.

Gum arabic is an exudate gum obtained from Acacia trees. The main species are Acacia senegal and Acacia seyal. Gum arabic is a branched molecule (see Industrial Gums, R. Whistler and J. BeMiller, Eds., 3rd Edition, Academic Press, pp. 311-318, 1993).

Larch gum or arabinogalactan is the hydrocolloid extracted from the Larch tree. The arabinogalactan is composed of galactose and arabinose units in a 6:1 ratio, with a trace of uronic acid. The molecular weights of the major fractions of arabinogalactan in larch gum are 16,000 and 100,000. A glycosyl linkage analysis of arabinogalactan is consistent with a highly branched structure comprising a backbone of 1,3-linked galactopyranose connected by 1,3-glycosidic linkages.

In one embodiment, an encapsulation composition contains 5 to 40% by weight, preferably 10 to 35% by weight, 15 to 30% by weight, or 20 to 30% by weight, based on the total weight of the glass matrix, of at least one component selected from the group consisting of a low molecular weight sugar, a low molecular weight polyol, a corn syrup solid, and a mixture thereof. Examples of suitable sugars include mono- and disaccharides (including glucose, sucrose, maltose, fructose, galactose, ribose, xylose, lactose, cellobiose, and trehalose), invert syrups, molasses, and corn syrups. The preferred sugars are glucose, maltose, and trehalose. The sugars can be used singly or in combination.

Polydextrose is a glucosyl homopolymer resulting from condensation of glucose in the presence of an acidic catalyst.

Polyols are a group of lower molecular weight ingredients known as polyhydric agents. Simple polyols include glycerine and propylene glycol that can be used as plasticizers. Examples of other polyols include erythritol, lactitol, mannitol, sorbitol, maltitol, isomalt, dulcitol, xylitol, hydrogenated corn syrups, hydrogenated glucose syrups, hydrogenated maltose syrups, and hydrogenated lactose syrups. The preferred polyols are mannitol, maltitol, and isomalt. The polyols can be used singly or in combination. Suitable corn syrup solids are the 24 to 42 D.E. corn syrup solids.

The term encapsulate as used in this application, includes agents such as medications, pesticides, preservatives, vitamins, food acids, salts, flavoring agent, perfumery chemicals and fragrances, and food colorants both synthetic and natural. Suitable medications include antacids, anti-inflammatory substances, coronary vasodilators, cerebral vasodilators, peripheral vasodilators, anti-infectives, psychotropics, anti-manics, stimulants, antihistamines, laxatives, decongestants, vitamins, gastrointestinal sedatives, antidiarrheal preparations, antianginal drugs, antiarrhythmics, antihypertensive drugs, vasoconstrictors, migraine treatments, anticoagulants, antithrombotic drugs, analgesics, antipyretics, hypnotics, sedatives, antiemetics, antinauseants, anticonvulsants, thyroid and antithyroid preparations, diuretics, antispasmodics, uterine relaxants, mineral and nutritional additives, antiobesity drugs, anabolic drugs, erythropoietic drugs, antiasthmatics, expectorants, cough suppressants, mucolytics, antiuricemic drugs, and other drug substances such as topical analgesics and local anesthetics, wherein the agents can be used singly or in combination.

Suitable pesticides include insecticides, nematocides, fungicides, herbicides, and microbicides. Insecticides, which may be encapsulated in the compositions of the present application include those disclosed in Kirk-Othmer, Encyclopedia of Chemical Technology, 4th Ed., vol. 14, Wiley, New York, pp. 524-602, 1995, and 3rd Ed., vol. 13, pp. 313-485, 1981, both of which are incorporated herein by reference. Suitable nematocides include, e.g., methyl N'N'-dimethyl-N-[(methylcarbamox)oxy]-1-thiooxamimidate (oxamyl) and those disclosed in Kirk-Othmer, Encyclopedia of Chemical Technology, 4th Ed., vol. 24, Wiley, New York, pp. 830-831, 1997, and 3rd Ed., vol. 18, pp. 305-308, 1982, both of which are incorporated herein by reference. Suitable fungicides include those disclosed in Kirk-Othmer, Encyclopedia of Chemical Technology, 4th Ed., vol. 12, Wiley, New York, pp. 204-227, 1994, and 3rd Ed., vol. 11, pp. 490-498, 1980, both of which are incorporated herein by reference. Suitable herbicides include those disclosed in Kirk-Othmer, Encyclopedia of Chemical Technology, 4th Ed., vol. 13, Wiley, New York, pp. 73-136, 1995, and 3rd Ed., vol. 12, pp. 297-351, 1980, both of which are incorporated herein by reference. Suitable antibiotics and antimicrobials include those disclosed in Kirk-Othmer, Encyclopedia of Chemical Technology, 4th Ed., vol. 2, Wiley, New York, pp. 854-1018, 1992, and vol. 3, pp. 1-346, 1992, both of which are incorporated herein by reference. Suitable vitamins include those disclosed in Kirk-Othmer, Encyclopedia of Chemical Technology, 4th Ed., vol. 25, Wiley, New York, pp. 1-17, 1998, and 3rd Ed., vol. 24, pp. 1-277, 1984, both of which are incorporated herein by reference. Suitable food additives, in addition to flavoring agents, include those disclosed in Kirk-Othmer, Encyclopedia of Chemical Technology, 4th Ed., vol. 11, Wiley, New York, pp. 805-833, 1994, and 3rd Ed., vol. 11, pp. 146-163, 1980, both of which are incorporated herein by reference. The pesticides may be used singly or in combination.

The term flavoring agent includes spice oleoresins and oils derived from allspice, basil, capsicum, cinnamon, cloves, cumin, dill, garlic, marjoram, nutmeg, paprika, black pepper, rosemary and turmeric; essential oils: anise oil, caraway oil, clove oil, eucalyptus oil, fennel oil, garlic oil, ginger oil, peppermint oil, onion oil, pepper oil, rosemary oil, and spearmint oil; citrus oils such as orange oil, lemon oil, bitter orange oil and tangerine oil; alliaceous flavors: garlic, leek, chive, and onion; botanical extracts: arnica flower extract, chamomile flower extract, hops extract, and marigold extract; botanical flavor extracts: blackberry, chicory root, cocoa, coffee, kola, licorice root, rose hips, sassaparilla root, sassafras bark, tamarind and vanilla extracts; protein hydrolysates: hydrolyzed vegetable protein (HVPs), meat protein hydrolysates, milk protein hydrolysates; and compounded flavors both natural and artificial including those disclosed in S. Heath, Source Book of Flavors, Avi Publishing Co. Westport, Conn., pp. 149-277, 1981, which is incorporated herein by reference. Representative flavor compounds are for example: benzaldehyde, diacetyl (2,2-butanedione), vanillin, ethyl vanillin and citral (3,7-dimethyl-2,6-octadienal). The flavoring agent may be in the form of oil, aqueous solution, non-aqueous solution or an emulsion. The flavoring agents may be used singly or in combination. Flavor essences, i.e., the water-soluble fraction derived from fruit or citrus can be utilized although at lower levels than the ingredients referenced above. As will be described more fully below, in one embodiment, a flavoring agent is itself a combination of volatile compounds with varying vapor pressures at ambient conditions, which is particularly advantageous.

Although the exact amount of an encapsulate encapsulated in a glass matrix depends, in part, upon the nature of the glass matrix, and the anticipated end use of the final composition, in one embodiment, the encapsulation composition comprises from 4 to 18% by weight, based on the total weight of the composition, of an encapsulate. Preferably, the encapsulation composition comprises from 6 to 12% by weight, based on the total weight of the composition, of an encapsulate. In one embodiment, the encapsulate is a flavoring agent.

When the encapsulate is a lipophilic flavor, the encapsulate can be dispersed in a glassy matrix of the final product usually with the aid of the surface active plant extract described above and, optionally, with an emulsifier added to the lipophilic phase or in the matrix mixture. Emulsifiers such as distilled monoglycerides, ethoxylated monoglycerides, lactylated monoglycerides, acetylated monoglycerides, diacetyl tartaric acid esters of monoglycerides (D.A.T.E.M.'s), propylene glycol monoesters, sorbitan monostearate, sorbitan tristearate, polyglycerol esters, polyoxyethylene sorbitan monoester and triesters, sucrose esters, sodium stearoyl lactylate (S.S.L.), lecithin, hydroxylated lecithin, oleyl lactylic acid, lactylated esters of monoglycerides, lactylated fatty acid esters of glycerol and propylene glycol, and lactylated esters of propylene glycol monoglycerides, and the sodium and potassium salts of fatty acids can be employed singly or in combination. The emulsifier(s) is(are) used at the level of 0.1 to 10% of the selected flavor. In one embodiment, the emulsifier is at least one sorbitan polyoxyethylene monoester.

In addition to the foregoing encapsulates, at least one optional ingredient such as conventionally used in the art, may be included in the encapsulation compositions of one embodiment. For example, colorings, sweeteners, food acids, salts, fragrances, diluents, flavor maskers, flavor enhancers, fillers, preservatives, antioxidants, stabilizers, and lubricants may be employed herein, if desired, singly or in combination.

The present encapsulation compositions are prepared by melt extrusion at the moisture content of the melt and product below 15%, more preferably between 6% and 12%, 6 and 11%, 6 and 10%, 6 and 9%, 6 and 8%, 5 and 7%, 4 and 7%, 3 and 7%, 2 and 5%, or between 1 and 12% by weight of the total encapsulation composition. The glass transition temperature of the composition is above room temperature and is preferably from 25 to 80° C., from 35 to 55° C., from 25 to 50° C., from 30 to 45° C., or from 30 to 40° C.

In the present process, the plasticizer may be liquid and is any plasticizer which is suitable for facilitating the formation of the melt in the extruder while at the same time affording a product which exists in the glassy state, rather than in the plastic or rubbery state at room temperature. Suitable plasticizers include water; glycerol; propylene glycol; aqueous solutions of glycerol, propylene glycol, monosaccharides, and disaccharides; and invert and high fructose corn syrups, which can be used singly or in combination In one embodiment, the composition is prepared by using water as a liquid plasticizer.

The plasticizer is added in an amount which results in the formation of a melt in the extruder, while at the same time affording a product which exists in the glassy state at room temperature. Thus, the amount of the added plasticizer may be selected to afford a product which has a Tg of at least 25° C., preferably at least 35° C., and more preferably at least 40° C.

Suitable carbohydrates which are used as a non-polymeric component in the formulas and which function in a concomitant fashion as a plasticizer include mono- and disaccharides, trehalose, invert syrups, molasses, corn syrups, and 36 to 42 D.E. corn syrup solids, which can be used singly or in combination. Suitable polyols are erythritol, sorbitol, mannitol, lactitol, maltitol, isomalt, dulcitol, xylitol, hydrogenated corn syrups, hydrogenated glucose syrups, hydrogenated maltose syrups, and hydrogenated lactose syrups, which can be used singly or in combination. In one embodiment, a carbohydrate is glucose and/or maltose, and a polyol is mannitol, sorbitol, isomalt, or a mixture thereof The glass matrix (B), along with the plasticizer forms a melt in the extruder. Although the mixing action of the extruder will supply heat to the matrix/plasticizer mixture, in one embodiment, additional heat may be supplied to ensure formation of the melt. The encapsulate (A) may be continuously added in a liquid phase to the feeding zone of the extruder by injection and mixed with the melted matrix/plasticizer mixture before exiting the extruder. In one embodiment, a non-aqueous, liquid plasticizer may be added to the encapsulate.

In certain embodiments, an additional emulsifier can be added to the dry blend.

Preferred flavorants may be compounded flavors, essential oils, citrus oils, fruit extracts and essences, oleoresins and other flavorant forms, which can be used singly or in combination. In some cases, the flavors can be diluted in a series of flavor solvents. These include fractionated coconut oils (medium chain triglycerides), propylene glycol, glycerol, and triacetin (glycerol triacetate) among others.

In one embodiment, a twin screw extruder is used.

When the encapsulation composition exits the extruder, it may be cooled in ambient temperature air, or in chilled or sub-ambient temperature air, or by passing through a liquid bath filled with a non-solubilizing fluid, for example, an alcohol or oil, with or without temperature control. For example, cold (5-15° C.) airflow can be used. Although not necessary, the cooled product may be further processed by size reduction, for example by grinding, milling, pulverizing, or a combination thereof. The product may also be treated with an anti-caking compound either before or after size reduction.

Other features of the invention will become apparent in the course of the following descriptions of exemplary embodiments which are given only for illustration of the invention and are not intended to be limiting thereof.

EXAMPLES

Extrusion

Melt extrusion was accomplished utilizing a pilot plant 2" extruder assembly with several heating and cooling zones. The 2" extruder assembly was fitted with a liquid injection port in the feeding zone of the unit, and a 0.031" multi-orifice die was used to extrude and shape the melt. A matrix composition which included pre-blended carbohydrates and a surface active plant extract(s) was metered into the feed port at a feed rate between 100 to 250 g/min of solids; a liquid plasticizer, most commonly water, was injected in the feed zone by a metering peristaltic pump. The heating/cooling zone temperatures varied within the range 170-300° F. Oil or water soluble flavors were used. In some cases, an emulsifier, such as Polysorbate 60 (polyoxyethylene [20] sorbitan monostearate), was added to the flavor at 0.5 to 5% (w/w emulsifier/flavor). After lining out the feed and conveying rates and bringing the unit into a steady-state, the extruded strands were air cooled, rapidly set into a brittle, glassy solid, and optionally milled. Alternatively, the strands were die-face cut at the die exit with a cutter equipped with rotating blades, and the particles were cooled or optionally dried then cooled.

Analytical Methods.

The particle density of the milled extruded strands was measured with a Micromeritics powder pycnometer, model AccuRys 1330 (Micromeritics, Norcross, Ga. 30093), using helium as a filling gas.

Moisture of the particles was determined by a Karl-Fisher method.

Total flavor was analyzed using a solvent extraction method. The result was reported as volume of flavor per weight of the encapsulation composition and converted to weight percentage of flavor in the encapsulation composition, using specific gravity of the analyzed flavor. In case of citrus flavors, specific gravity 0.85 g/cc was applied.

A TA Instruments Modulated Differential Scanning calorimeter (MDSC) (TA Instruments, New Castle, Del. 19720) equipped with a DSC 2920 cell and a Refrigerated Cooling Unit was used to determine the glass transition temperature. Samples (up to 15 mg) were hermetically sealed in coated aluminum pans, and nitrogen was used as a purge gas. A modulated mode employed a sinusoidal modulation of linearly increasing temperature was used and allowed separation and characterization of glass transition as a reversing process. A heating ramp rate 5° C./min was employed in the range from −12° C. to 100° C. in combination with +/−1° C. modulation amplitude and 30 s period of modulation. The glass transition temperature was determined as a midpoint of the glass transition temperature interval. The MDSC tests were run in duplicate.

Example 1

A matrix composition which included 80% by weight of maltodextrin 5 DE, 15% of maltodextrin 18 DE, and 5% of a high saponin *Quillaja* extract (Quext100, Garuda International Inc.) was dry blended and fed at a rate of 114 g/min into the extruder assembly. Deionized water was metered into the feed port at 4 g/min. The heating and cooling zone temperatures were set at 220-250° F. and 190-210° F., respectively. A flavor containing by weight 94.45% of Orange Valencia oil (5 fold), 0.55% of mixed tocopherols, and 5% Polysorbate 60 was metered into the mix at 14 g/min. The screw speed was maintained at 100 rpm to mix and melt the blend, and homogenize the flavor. The encapsulation composition was extruded using the extruder assembly equipped with a 0.031" multi-orifice die. The strands were collected and cooled by chilled air (5-15° C.) to yield a glassy solid. The resultant solid had the glass transition temperature (Tg) 50.6° C. The product had 10.3% moisture and 9.9% of the flavor by weight.

Comparative Example 2

A matrix composition which included 80% by weight of maltodextrin 5 DE and 20% of maltodextrin 18 DE was dry blended and fed at 228 g/min into the extruder assembly. Deionized water was metered into the feed port at 18 g/min. The heating and cooling zone temperatures were set at 220-250° F. and 190-210° F., respectively. A flavor containing by weight 94.45% of Orange Valencia oil (5 fold), 0.55% of mixed tocopherols, and 5% Polysorbate 60 was metered into the mix at 6% by weight of the encapsulation composition. The screw speed was maintained at 100 rpm to mix and melt the blend, and homogenize the flavor. The encapsulation composition was extruded using the extruder assembly equipped with a 0.031" multi-orifice die. The oil was effectively encapsulated without visible flavor loss. When the flavor load was increased to 8% by weight of the total composition, loose flavor drops and surface oil appeared. Thus, the composition could not effectively encapsulate 8% flavor by weight.

Comparative Example 3

A matrix composition which included 80% by weight of maltodextrin 5 DE, 17% of maltodextrin 18 DE, and 3% of a high saponin *Quillaja* extract (Quext100, Garuda International Inc.) was dry blended and fed at a rate of 114 g/min into the extruder assembly. Deionized water was metered into the feed port at 10 g/min. The heating and cooling zone temperatures were set at 220-250° F. and 190-210° F., respectively. A flavor containing by weight 94.45% of Orange Valencia oil (5 fold), 0.55% of mixed tocopherols, and 5% Polysorbate 60 was metered into the mix at 10.7 g/min. The screw speed was set at 100 rpm to mix and melt the blend, and homogenize the flavor. The encapsulation composition was extruded using the extruder assembly equipped with a 0.031" multi-orifice die. The strands were collected and cooled by a chilled air to yield a glassy solid. A slight flavor dripping was observed with a few flavor bubbles visible inside the strands. This observation shows that the 8% theoretical flavor load by weight is not effectively encapsulated in the composition. The strands had 5.2% moisture and 5.1% of volatile oil by weight as measured. This clearly shows that a significant part of the flavor has been lost during processing. Then the flavor load was reduced to the rate 9.5 g/min corresponding to 7.1% theoretical flavor load by weight. There was no visible flavor loss, however, occasional flavor bubbles were still observed in the strands, indicating that the flavor load was somewhat too high for effective encapsulation. The sample contained 4.6% moisture and 6.0% flavor by weight. This data indicates that only between 6 and 7% flavor by weight can be effectively encapsulated by this composition under the specified processing conditions.

Example 4

The matrix composition of Comparative Example 3 was dry blended and fed at a rate of 228 g/min into the extruder. Deionized water was metered into the feed port at 21 g/min. The extrusion assembly temperature was maintained at about 220-250° F. in the heating zone and 190-210° F. in the cooling zone. A flavor containing Orange Valencia oil (5 fold) was metered into the mix at 30 g/min. The screw speed was set at 150 rpm to mix and melt the blend, and homogenize the flavor. The encapsulation composition was extruded using a 0.040" multi-orifice die. The strands were collected and cooled by chilled air (5-15° C.) to yield a glassy solid. The resultant solid had glass transition temperature (Tg) 41.3° C. The product contained 10.7% moisture and 9.9% of flavor by weight. Very few flavor bubbles were observed in the strands indicating that a maximum in flavor load was reached. That maximum was significantly higher than that in the comparative Example 3 thus showing that absence of the emulsifier in the flavor and the increased homogenizing intensity contributed to the increased flavor load.

Example 5

A matrix composition which included 70% by weight of maltodextrin 18 DE, 29% of trehalose dihydrate, and 1% of a licorice extract (Magnasweet 100, Mafco) was dry blended and fed at 228 g/min into the extruder assembly. Deionized water was metered into the feed port at 3 g/min. The heating and cooling zone temperatures were set at 220-250° F. and 180-200° F., respectively. A lemon flavor (McCormick BSH11159008) was metered into the mix at 20 g/min. The screw speed was held at 175 rpm to mix and melt the blend, and homogenize the flavor. The encapsulation composition was extruded through a 0.031" multi-orifice die. The strands were collected and cooled by chilled air (5-15° C.) to yield a glassy solid. The resultant solid had the glass transition temperature (Tg) 44.5° C. The strands had 5.5% moisture and 6.8% of the flavor by weight. The encapsulation composition made under similar conditions and not containing licorice extract could hold only 4.7% of flavor by weight. Thus, licorice extract helped increase the flavor load by about 2% by weight.

The composition of this example was also processed into discrete particles by a die-face cutting the extruded strands by a cutter equipped with three rotating blades. The particles contained 5.9% of the flavor by weight.

The invention claimed is:

1. An extrusion encapsulation composition in a glassy state, comprising:
   (A) An encapsulate, encapsulated in (B) a glassy matrix, wherein said glassy matrix (B) comprises: 0.5 to 5% by weight, based on the total weight of said glassy matrix (B), of at least one surface active water soluble plant extract comprising a *Quillaja* extract, and 88 to 99% by weight, based on the total weight of said glassy matrix (B), of at least one carbohydrate comprising a maltodextrin, a sugar and/or a polyol,
   wherein a load of an encapsulate (A) is from 4% to 15% by weight, based on the total weight of the extrusion encapsulation composition, and wherein the load of the encapsulate (A) is increased due to the presence of the at least one surface active water soluble plant extract in the glassy matrix (B), compared to a level of the encapsulate (A) when the glassy matrix (B) does not contain the at least one surface active water soluble plant extract;
   wherein said extrusion encapsulation composition is prepared by a process comprising:
   (i) mixing components of the glassy matrix (B), the encapsulate (A), and, optionally, a plasticizer, thereby obtaining a blend having a water content of below 10% by weight, and melting the blend in an extruder or in a combination of extruders, thereby obtaining a melted mixture comprising the encapsulate (A) and the glassy matrix (B) and having a water content of below 10% by weight;
   (ii) extruding, shaping, and cooling said melted mixture, thereby obtaining said extrusion encapsulation composition, wherein said encapsulate (A) is encapsulated in the glassy matrix (B), and
   (iii) optionally, drying the extruded encapsulation composition,
   wherein, the shaping is performed by extruding and die-face cutting the melted mixture to form particles.

2. The composition of claim 1, which has a glass transition temperature of from 25° C. to 80° C.

3. The composition of claim 1, wherein said glassy matrix (B) comprises from 2% to 8% by weight, based on the total weight of said glassy matrix B, of a *Quillaja* extract.

4. The composition of claim 1, wherein said encapsulate is at least one component selected from the group consisting of a flavor, a vitamin, a dietary supplement, a medication, a preservative, and a pesticide.

5. The composition of claim 1, wherein said encapsulate is a flavor.

6. The composition of claim 3, wherein said encapsulate is a flavor.

7. The composition of claim 4, wherein said flavor is at least one flavor selected from the group consisting of a natural flavor, an oleoresin, an essential oil, a protein hydrolyzate, an aqueous reaction flavor, an artificial flavor, and a compounded flavor.

8. The composition of claim 1, wherein said plasticizer is at least one plasticizer selected from the group consisting of water, glycerin, and propylene glycol.

9. The composition of claim 1 where the encapsulate (A) contains an emulsifier.

10. The composition of claim 1, wherein said shaping is performed by extruding the melted mixture through a die to form strands, wherein said strands are milled after the drying and cooling.

11. The composition of claim 1, wherein said particles are cooled and, optionally, dried.

12. The composition of claim 1, wherein the load of the encapsulate (A) is increased by up to 8%, based on the total weight of the extrusion encapsulation composition.

13. A method of making the extrusion encapsulation composition of claim 1, the process comprising:
   (i) mixing components of the glassy matrix (B), the encapsulate (A), and, optionally a plasticizer, thereby obtaining a blend having a water content of below 10% by weight, and melting the blend in an extruder or in a combination of extruders, thereby obtaining a melted mixture comprising the encapsulate (A) and the glassy matrix (B) and having a water content of below 10% by weight;
   (iii) extruding, shaping, and cooling said melted mixture, thereby obtaining said composition, wherein said encapsulate (A) is encapsulated in the glassy matrix (B), and
   (iv) optionally, drying the extruded encapsulation composition,
   wherein, the water is present in a content of below 10% by weight, and
   the shaping is performed by extruding and die-face cutting the melted mixture to form particles.

14. The method of claim 13, wherein said encapsulation composition has a glass transition temperature of from 25° C. to 80° C.

15. The method of claim 13, wherein said glassy matrix (B) comprises from 2% to 8% by weight, based on the total weight of said glassy matrix (B), of a *Quillaja* extract.

16. The method of claim 13, wherein said encapsulate is at least one component selected from the group consisting of a flavor, a vitamin, a dietary supplement, a medication, a preservative, and a pesticide.

17. The method of claim 16, wherein said encapsulate is a flavor.

18. The method of claim 15, wherein said encapsulate is a flavor.

19. The method of claim 16, wherein said flavor is at least one flavor selected from the group consisting of a natural flavor, an oleoresin, an essential oil, a protein hydrolyzate, an aqueous reaction flavor, an artificial flavor, and a compounded flavor.

20. The method of claim 13, wherein said plasticizer is at least one plasticizer selected from the group consisting of water, glycerin, and propylene glycol.

21. The method of claim 13, wherein said encapsulant (A) contains an emulsifier.

22. The method of claim 13, wherein said shaping is performed by extruding the melted mixture through a die to form strands, and wherein said strands are milled after the drying and cooling.

23. The method of claim 13, wherein said particles are cooled and optionally dried.

24. The method of claim 13, wherein the load of the encapsulate (A) is increased by up to 8%, based on the total weight of the extrusion encapsulation composition.

25. A food containing the extrusion encapsulation composition of claim 1.

26. An extrusion encapsulation composition in a glassy state, comprising:
   (A) an encapsulate, encapsulated in (B) a glassy matrix, wherein said glassy matrix (B) comprises: 0.5 to 12% by weight, based on the total weight of said glassy matrix (B), of at least one surface active water soluble plant extract comprising a *Quillaja* extract, and 88 to 99.5% by weight, based on the total weight of said glassy matrix (B), of at least one carbohydrate comprising a maltodextrin, a sugar and/or a polyol, wherein the encapsulate (A) is at least one component selected from the group consisting of a flavor, a vitamin, a dietary supplement, a medication, a preservative, and a pesticide, wherein a load of the encapsulate (A) is from 0.01% to 20% by weight, based on the total weight of the extrusion encapsulation composition, wherein said extrusion encapsulation composition is prepared by a process comprising mixing the encapsulate (A) and the glassy matrix (B) and optionally a plasticizer, thereby obtaining a blend having a water content of below 10% by weight, and melt extruding the blend, thereby obtaining a blend with a water content of below 10% by weight, and wherein the melt extruding comprises extruding and die-face cutting the melted mixture to form particles.

27. The composition of claim 12, wherein the increase of the load of the encapsulate (A) is an increase of the maximum load of the encapsulate (A).

28. The composition of claim 26, wherein the load of the encapsulate (A) is increased by up to 8%, based on the total weight of the extrusion encapsulation composition due to the presence of said surface active water soluble plant extract in said glassy matrix (B).

29. The composition of claim 28, wherein the increase of the load of the encapsulate (A) is an increase of the maximum load of the encapsulate (A).

30. The composition of claim 1, wherein a significant loose encapsulate is not observed or determined.

31. The composition of claim 1, wherein an amount of the encapsulate (A) at the surface of the encapsulated composition is not greater than 10% of the total amount of the encapsulate (A).

32. The composition of claim 1, wherein an amount of the encapsulate (A) at the surface of the encapsulated composition is not greater than 0.1% of the total amount of the encapsulate (A).

33. The composition of claim 26, wherein a significant loose encapsulate is not observed or determined.

34. The composition of claim 26, wherein an amount of the encapsulate (A) at the surface of the encapsulated composition is not greater than 10% of the total amount of the encapsulate (A).

35. The composition of claim 26, wherein an amount of the encapsulate (A) at the surface of the encapsulated composition is not greater than 0.1% of the total amount of the encapsulate (A).

36. The composition of claim 1, wherein water is present in the melted mixture only as a plasticizer.

37. The composition of claim 26, wherein water is present in the melted mixture only as a plasticizer.

38. The composition of claim 1, wherein the at least one carbohydrate is a combination of maltodextrin and sugar, and wherein a sugar content of the encapsulation composition is from 5 to 40% by weight.

39. The composition of claim 1, wherein the at least one carbohydrate comprises maltodextrin having a Dextrose Equivalent (DE) of 10 DE or less.

40. The composition of claim 1, which has a glass transition temperature of from 25° C. to 50° C.

41. The composition of claim 1, which has a glass transition temperature of from 25° C. to 45° C.

* * * * *